United States Patent
Maxwell et al.

[11] Patent Number: 6,131,561
[45] Date of Patent: Oct. 17, 2000

[54] BURNER WITH SECONDARY AIR STABILITY RING

[75] Inventors: Douglas Myron Maxwell, Gallatin; James Lewis Ayres; Joseph A. Donoho, both of Springfield, all of Tenn.; Bobby R. Goodman, Lewisburg, Ky.; Wiley William Miller, Springfield, Tenn.

[73] Assignees: Lincoln Brass Works, Inc., Jacksboro; Frigidaire Home Products, Springfield, both of Tenn.

[21] Appl. No.: 09/021,914

[22] Filed: Feb. 11, 1998

[51] Int. Cl.[7] .............................. F24C 3/00; F24C 15/10; F23D 14/46
[52] U.S. Cl. ................. 126/39 R; 126/39 E; 126/214 D; 431/350; 431/286
[58] Field of Search .............................. 126/39 R, 39 E, 126/214 D; 431/266, 354, 350, 191, 286, 192, 193; 239/567

[56] References Cited

U.S. PATENT DOCUMENTS

| | | |
|---|---|---|
| 3,299,941 | 1/1967 | Frick ...................................... 126/39 R |
| 3,905,756 | 9/1975 | Ferlin et al. .............................. 431/354 |
| 4,206,492 | 6/1980 | Rhodes et al. ........................... 431/191 |
| 4,572,154 | 2/1986 | Schweitzer . |
| 4,626,196 | 12/1986 | Stohrer, Jr. ............................. 126/39 E |
| 4,627,411 | 12/1986 | Mertler ................................. 126/39 R |
| 5,186,158 | 2/1993 | Ferlin . |
| 5,335,646 | 8/1994 | Katchka ................................ 126/39 E |
| 5,464,004 | 11/1995 | Maughan . |
| 5,468,145 | 11/1995 | Ferlin . |
| 5,639,232 | 6/1997 | Bogenschutz et al. . |
| 5,649,822 | 7/1997 | Gertler et al. . |
| 5,865,615 | 2/1999 | Simpson et al. ....................... 126/39 R |

*Primary Examiner*—Ira S. Lazarus
*Assistant Examiner*—David Lee
*Attorney, Agent, or Firm*—Harness, Dickey & Pierce, P.L.C.

[57] ABSTRACT

A gas range has a plurality of burners each of which extend through a respective burner opening in a range top of the gas range. A gap is formed between each burner assembly and its respective opening. Each burner assembly includes a burner head which includes an annular air stability ring which extends into the gap between the burner assembly and the range top. The air stability ring deflects flue products escaping through this gap away from the burner ports. By deflecting the flue products away from the burner ports, the flame eminating from the burner ports is stabilized permitting more efficient combustion of the gas.

16 Claims, 2 Drawing Sheets

BURNER WITH SECONDARY AIR STABILITY RING

FIELD OF THE INVENTION

The present invention relates to gas burners. More particularly, the present invention relates to gas burners for range tops which incorporate a secondary air stability ring which shields the flame from air currents.

BACKGROUND OF THE INVENTION

Domestic household gas cooking ranges normally include a range top which has a plurality of gas burners. These gas burners can be divided into two styles, the first being a sealed cook top burner and the second being an open cook top burner. Sealed gas top burners are normally disposed around a burner opening of the range top and are secured around the periphery of the opening so that any spillage of food will remain on the range top and not pass between the burner head and the burner opening into the interior of the range. Open cook top burners are normally supported by structure which is located below the range top and they extend through a burner opening in the rang top. There is an annular space which exists between the burner head and the burner opening. This annular space generally varies in width from one-half of an inch to one and one-half inches and has over the years presented problems to the range designers, the range manufacturers and the end users of the range.

This annular space can allow spills to fall through the underlying burner box and this annular space can also provide a non-intended opening for flue products to emit especially when the oven or any other burner compartment located below the top section begin to operate. When the flue products exit through this annular space and thus around the burner, a disturbance in flame operation can result causing an objectionable flame lifting, flame floating and/or flame blowing. This phenomenon is quite common in varying degrees in all gas ranges and is most noticeable in the first five to ten minutes of oven operation when the appliance oven is in the process of establishing and maintaining the intended path for the flue products to exit. When an oven or any other burner compartment located below the top section is ignited, the gas range must develop the intended path for flue products to exit. Commonly, the flow path is through a sheet metal box extending from the oven compartment cavity, passing through the top burner compartment and terminating above the top section of the gas range at a position normally in the center of the range towards the rear portion of the range. This process is known in the industry as developing "a stack action". The development of "stack action" is similar to developing a draft in a fireplace or chimney. During the time that this "stack action" is being developed, the flue products will have a tendency to exit the burner compartment through the annular space around the burners. The flow of these flue products through the annular space causes the disturbance in flame operation discussed above. The gas range industry recognizes this problem and has developed gas range standard Z21.1 which can be the basis for rejection of a gas range under the certification process. The solution to this flame disturbance problem in the past has been to adjust the air shutter associated with the top burners, closing down the primary air, to settle the flame allowing it to cling to the burner ports of the gas burners. Closing down of the primary air can cause CO levels to rise and can only be addressed by derating the burners which is undesirable.

Thus, the continued development of gas burners has included design efforts directed to the elimination or reduction of this flame disturbance problem during the development of "stack action" without compromising the performance of the burner.

SUMMARY OF THE INVENTION

The present invention discloses a unique burner which addresses all of the "stack action" phenomenon problems by incorporating an integral secondary air stability ring in the burner head that diverts or deflects the contaminated air moving through the annular space. The integral air stability ring deflects the contaminated air around and away from the base of the burner flame allowing only fresh combustion air to the individual flamelets resulting in very low CO emissions. CO emissions of less than 300 ppm have been recorded while simultaneously maintaining a stable blue flame on the burner head, whether the fuel be natural gas or propane. While it would be possible to add the ring as an added piece, the present invention incorporates the ring integrally into the burner head resulting in an economical burner having no loose parts. The integral incorporation of the ring also maintains the location of the ring with respect to the burner ports secondary air ledge and the distance it extends out from the burner side wall. These features have been found to be critical to the operation of this new and unique burner design.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
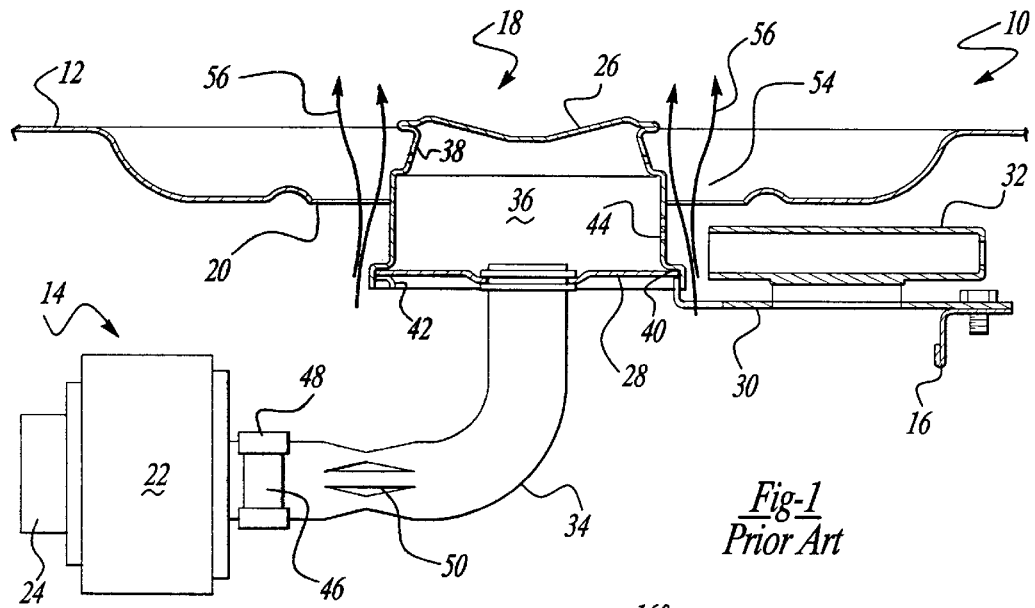
FIG. 1 is a partial vertical cross section of a typical range top incorporating a prior art burner.

Referring now to the drawings in which like reference numerals designate like or corresponding parts throughout the several views, there is shown in FIG. 1 a typical range incorporating an open top burner which is designated generally by reference numeral 10. Range 10 comprises a main range top 12, a gas manifold assembly 14, a supporting channel 16 and a burner assembly 18. Range top 12 defines a burner opening 20 through which burner assembly 18 extends. While only a partial cross section of range 10 and range top 12 is being illustrated, it is to be understood that range 10 and range top 12 include a plurality of burner openings 20 through each of which extends a respective burner assembly 18.

Gas manifold assembly 14 is disposed below range top 12 and is supported by range 10 as is well known in the art. Gas manifold assembly 14 comprises a gas manifold 22 and a plurality of gas valves 24. Each gas valve 24 is connected to a respective burner assembly 18 and includes controls (not shown) which are conveniently located on the outside of range 10 in order to facilitate the use of range 10 by an individual. Supporting channel 16 is also disposed below range top 12 and is supported by range 10 as is well known in the art.

Burner assembly 18 is supported at one end by gas manifold assembly 14 and is supported at the opposite end by supporting channel 16. Burner assembly 18 comprises a burner head 26, an end plate 28, a support bracket 30, a flash tube 32 and a venturi tube 34. Burner head 26 extends through burner opening 20 and defines a gas chamber 36 and a plurality of burner ports 38. End plate 28 is secured to burner head 26 by being held against a shoulder 40 by a plurality of crimped sections 42. End plate 28 closes chamber 36. Support bracket 30 is integral with end plate 28 and extends laterally from burner head 26 to connect to supporting channel 16 to provide part of the support for burner assembly 18. Flash tube 32 is attached to support bracket 30 and extends between a plurality of gas apertures 44 which extend through burner head 26 and a source of ignition (not shown). The source of ignition can be a pilot flame or a spark generating apparatus as is well known in the art. Venturi tube 34 extends between end plate 28 and gas valve 24 to provide the remaining support for burner assembly 18. Venturi tube 34 includes a primary air inlet 46 having a shutter 48 and an integrally formed venturi tube 50.

Operation of burner assembly 18 begins by an individual opening the respective valve 24 to allow gas to flow through venturi tube 34 where it mixes with primary air from inlet 46 prior to entering gas chamber 36. The air/gas mixture within chamber 36 exits through the plurality of burner ports 38 and the plurality of gas apertures 44 and is directed by flash tube 32 to the source of ignition. The source of ignition ignites the air/gas mixture which flashes through flash tube 32 to ignite the air/gas mixture exiting chamber 36 through the plurality of burner ports 38.

When an oven burner or other burner (not shown) located below range top 12 of range 10 is in operation, the burning of the gas creates flue products which exit the area below range top 12 through the plurality of burner openings 20. With burner assembly 18 being located within each of the openings 20, these flue products are forced to exit through a portion of opening 20 which is a gap 54 formed between burner head 26 and range top 12 as shown by arrows 56. Due to the shape of burner head 26, the air currents illustrated by arrows 56 cause objectionable flame lifting, flame floating and/or flame blowing of the flames emanating from the plurality of burner ports 38. The prior art solution to this problem was to use shutter 48 to close off portions of inlet 46 which leads to increase CO levels.

Figure 2:
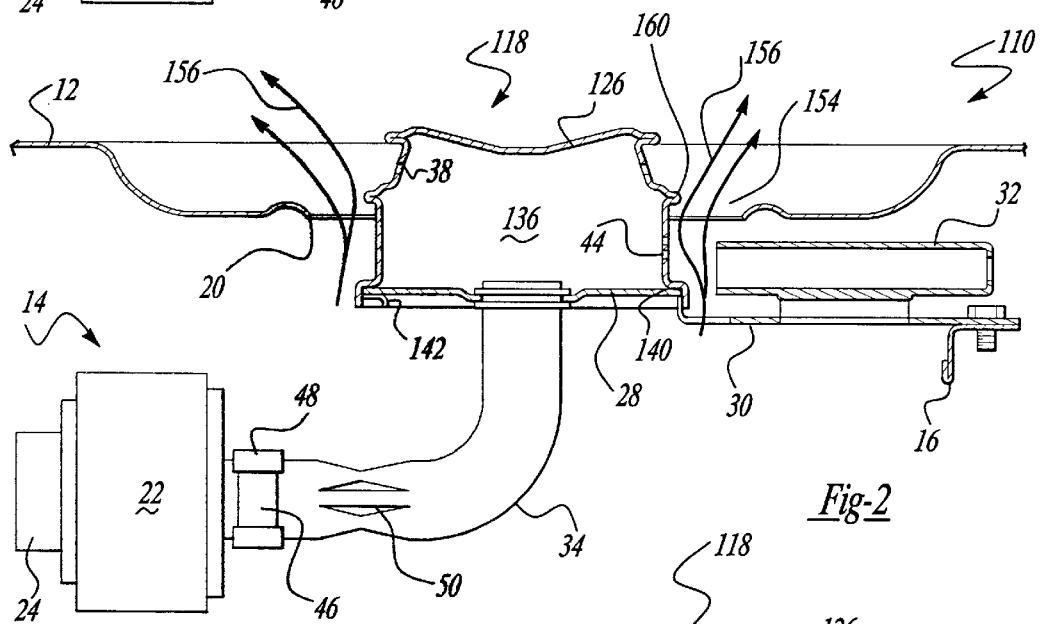
FIG. 2 is a partial vertical cross section similar to FIG. 1 but incorporating an open burner in accordance with the present invention.
Figure 3:
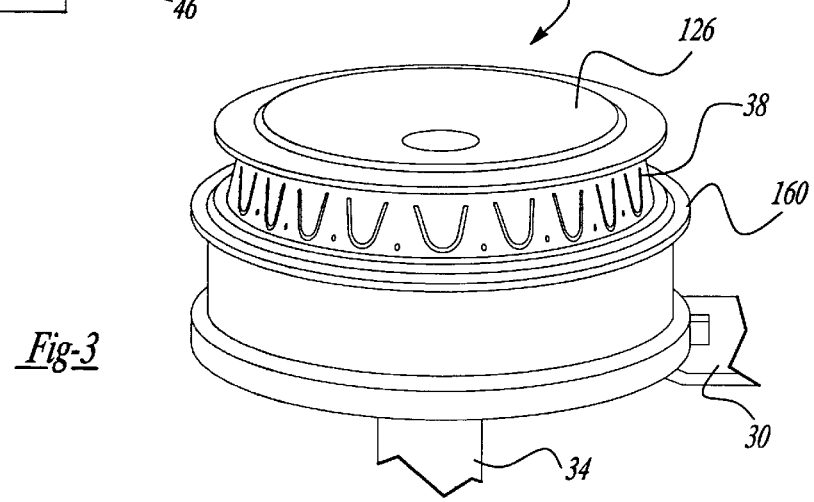
FIG. 3 is a perspective view of the open burner shown in FIG. 2.
Figure 4:
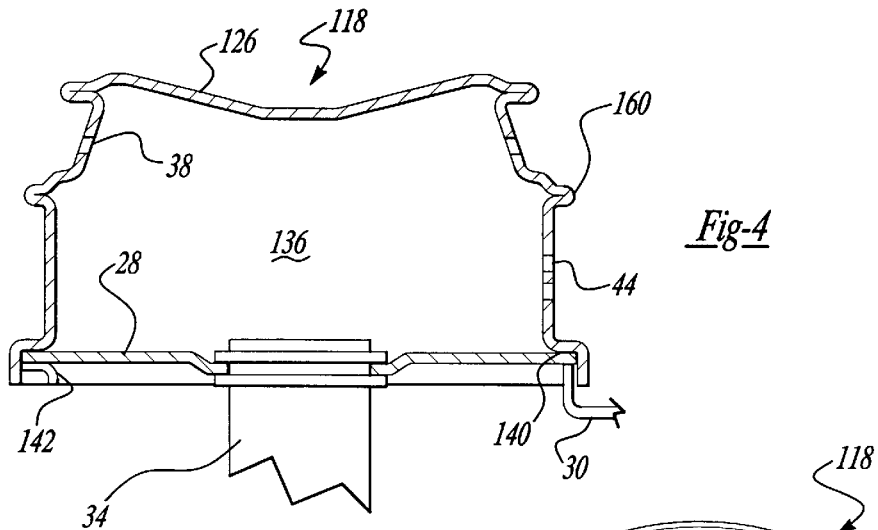
FIG. 4 is a vertical cross sectional view of the open burner shown in FIGS. 2 and 3.
Figure 5:
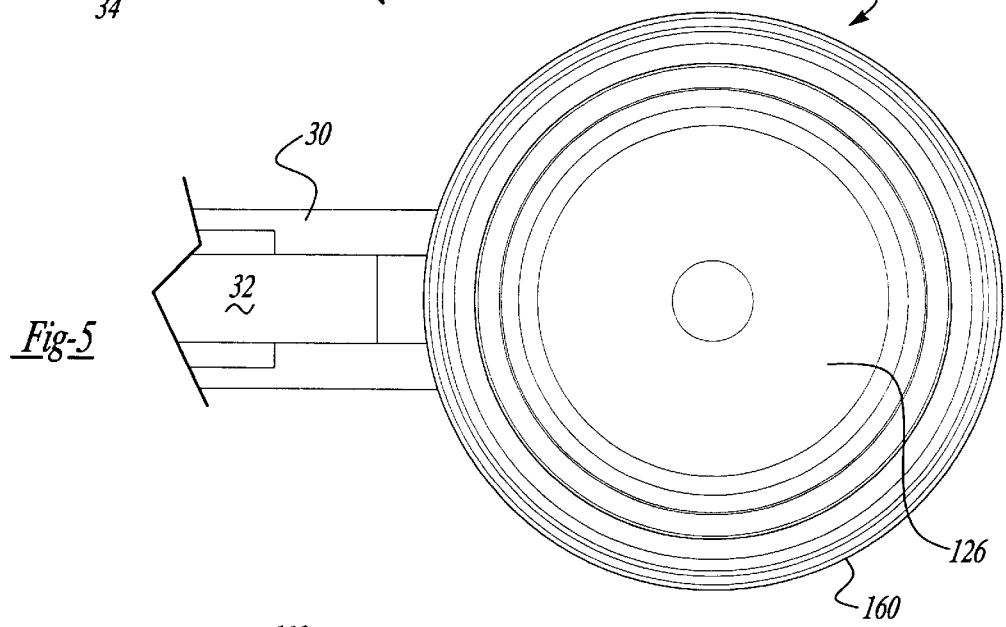
FIG. 5 is a plan view of the open burner shown in FIGS. 2–4.
Figure 6:
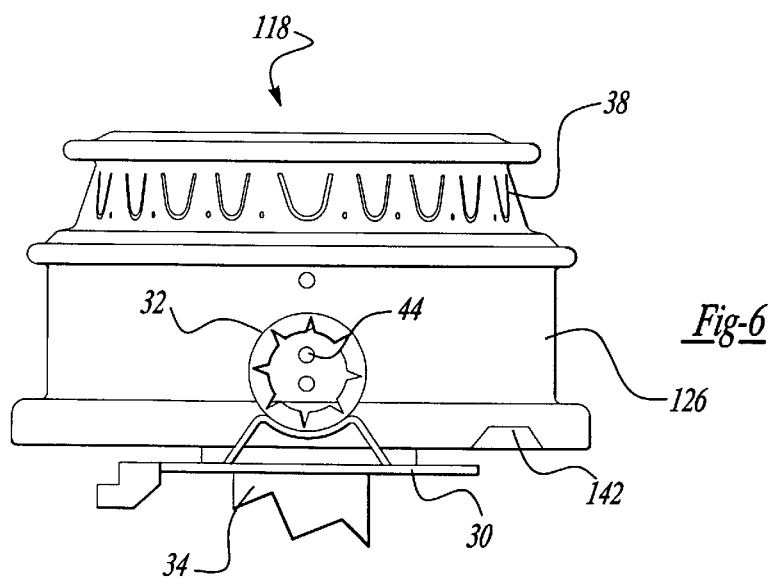
FIG. 6 is a side elevational view of the open burner shown in FIGS. 2–5.

FIG. 2 illustrates a range in accordance with the present invention which is designated generally by the reference numeral 110. Range 110 comprises range top 12, gas manifold assembly 14, supporting channel 16 and a burner assembly 118. Range top 12 defines burner opening 20 through which burner assembly 118 extends. While only a typical cross section of range 110 and range top 12 is being illustrated, it is to be understood that range 110 and range top 12 include the plurality of openings 20 through each of which extends a respective burner assembly 118.

Gas manifold assembly 14 is disposed below range top 12 and is supported by range 110 as is well known in the art. Gas manifold assembly 14 comprises a gas manifold 22 and a plurality of gas valves 24. Each gas valve 24 is connected to a respective burner assembly 118 and includes controls (not shown) which are conveniently located on the outside of range 110 in order to facilitate the use of range 110 by an individual. Supporting channel 16 is also disposed below range top 12 and is supported by range 110 as is well known in the art.

Referring now to FIGS. 3–6, Burner assembly 118 is supported at one end by gas manifold assembly 14 and is supported at the opposite end by supporting channel 16. Burner assembly 118 comprises a burner head 126, end plate 28, support bracket 30, flash tube 32 and venturi tube 34. Burner head 126 extends through burner opening 20 of range top 12 and defines a gas chamber 136 and the plurality of burner ports 38. End plate 28 is secured to burner head 126 by being held against a shoulder 140 by a plurality of crimped sections 142. End plate 28 closes gas chamber 136. Support bracket 30 is integral with end plate 28 and extends laterally from burner head 126 to connect to supporting channel 16 to provide part of the support for burner assembly 118. Flash tube 32 is attached to support bracket 30 and extends between the plurality of gas apertures 44 which extend through burner head 126 and the source of ignition (not shown). The source of ignition can be a pilot flame or a spark generating apparatus as is well known in the art. Venturi tube 34 extends between end plate 28 and gas valve 24 to provide the remaining support for burner assembly 118. Venturi tube 34 includes primary air inlet 46 having shutter 48 and integrally formed venturi 50.

Burner head 126 includes an integral annular shaped stability ring 160 which extends radially outwardly from burner head 126 into a gap 154 defined between stability ring 160 and the portion of range top 12 defining opening 20 to shield the flames eminating from the plurality of burner ports 38. While stability ring 160 is being illustrated as an integral part of burner head 126, it is within the scope of the present invention to have a separate stability ring 160 which is press fit, brazed or otherwise secured to the outer surface of burner head 126.

Operation of burner assembly 118 begins by an individual opening the respective valve 24 to allow gas to flow through venturi tube 34 where it mixes with primary air from inlet 46 prior to entering gas chamber 136. The air/gas mixture within chamber 136 exits through the plurality of burner ports 38 and the plurality of gas apertures 44 and is directed by flash tube 32 to the source of ignition. The source of ignition ignites the air/gas mixture which flashes through flash tube 32 to ignite the air/gas mixture exiting chamber 136 through the plurality of burner ports 38.

When an oven burner or other burner (not shown) located below range top 12 of range 110 is in operation, the burning of the gas creates flue products which exit the area below range top 12 through the plurality of burner openings 20. With burner assembly 118 being located within each of the openings 20, these flue products are forced to exit through a portion of opening 20 which is gap 154 formed between burner head 126 and range top 12 as shown by arrows 156. When the flue products exit through gap 154, they contact annular shaped stability ring 160 and are directed radially outward away from the plurality of burner ports 38. By directing the flow of flue products away from the plurality of burner ports 38, eliminating the disturbance in flame operation which is known as "stack action" is eliminated. Thus, the flame lifting, flame floating and/or flame blowing are eliminated. The elimination of "stack action" is accomplished without the need to close down the primary air which results in more efficient combustion and the significant reduction in the CO emission levels from the operation of the burners.

While the above detailed description describes the preferred embodiment of the present invention, it should be understood that the present invention is susceptible to modification, variation and alteration without deviating from the scope and fair meaning of the subjoined claims.

What is claimed is:

1. A gas burner assembly comprising:
   a burner head having an annular wall with an upper portion defining a plurality of burner ports;
   an end plate attached to a lower portion of said annular wall of said burner head, said end plate in conjunction with said burner head defining a gas chamber interior to said burner head, said gas chamber being supplied with an air/gas mixture;
   an air stability ring disposed around said burner head adjacent to said plurality of burner ports, said air stability ring extending radially outwardly from said annular wall of said burner head such that air flowing along said annular wall of said burner head from said lower portion towards said upper portion is deflected by said air stability ring prior to said air passing said plurality of burner ports.

2. The gas burner assembly according to claim 1, wherein said air stability ring is integrally formed with said burner head.

3. The gas burner assembly according to claim 1, wherein said burner head defines a cylindrical surface and said air stability ring extends radially outwardly from said cylindrical surface of said burner head.

4. The gas burner assembly according to claim 1 further comprising a venturi tube connected to said end plate, said air/gas mixture being supplied to said chamber through said venturi tube.

5. The gas burner assembly according to claim 1 further comprising a support bracket connected to said end plate.

6. The gas burner assembly according to claim 5 further comprising a flash tube connected to said bracket.

7. The gas burner assembly according to claim 6, wherein said burner head defines at least one gas aperture in communication with said flash tube.

8. The gas burner assembly according to claim 1, wherein said air stability ring is located between said burner ports and said end plate.

9. A gas range comprising:
   a range top defining a plurality of burner openings;
   a gas manifold connected to said range top;
   a plurality of burner assemblies connected to said gas manifold, each of said burner assemblies extending through a respective burner opening to define a gap, each of said burner assemblies comprising:
   a burner head having an annular wall with an upper portion defining a plurality of burner ports;
   an end plate attached to a lower portion of said annular wall of said burner head, said end plate in conjunction with said burner head defining a gas chamber interior to said burner head, said gas chamber being supplied with an air/gas mixture from said gas manifold;
   an air stability ring disposed around said burner head adjacent to said plurality of burner ports, said air stability ring extending radially outwardly from said annular wall of said burner head such that air flowing along said annular wall of said burner head from said lower portion towards said upper portion is deflected by said air stability ring prior to said air passing said plurality of burner ports.

10. The gas range according to claim 9, wherein said air stability ring is integrally formed with said burner head.

11. The gas range according to claim 9, wherein said burner head defines a cylindrical surface and said air stability ring extends radially outward from said cylindrical surface of said burner head into said gap.

12. The gas range according to claim 9 further comprising a venturi tube connected to said end plate of each of said burner assemblies and said gas manifold, said air/gas mixture being supplied to each of said chambers through a respective venturi tube.

13. The gas range according to claim 12 further comprising a gas valve disposed between said gas manifold and each of said venturi tubes.

14. The gas range according to claim 9 further comprising a gas valve disposed between said gas manifold and each of said burner assemblies.

15. The gas range according to claim 9 further comprising a supporting channel connected to said range top, each of said burner assemblies including a bracket connected to said supporting channel.

16. The gas burner assembly according to claim 9, wherein said air stability ring is located between said burner ports and said end plate.

* * * * *

UNITED STATES PATENT AND TRADEMARK OFFICE
CERTIFICATE OF CORRECTION

PATENT NO. : 6,131,561
DATED : October 17, 2000
INVENTOR(S) : Douglas Myron Maxwell et al It is certified that error appears in the above-identified patent and that said Letters Patent is hereby corrected as shown below:

Column 1, line 22, "rang" should be -- range --.

Column 4, line 7, "Burner" should be -- burner --.

Column 4, line 32, "eminating" should be -- emanating --.

Column 6, line 26, "outward" should be -- outwardly --.

Signed and Sealed this

Twenty-fourth Day of April, 2001

Attest:

NICHOLAS P. GODICI

*Attesting Officer*   *Acting Director of the United States Patent and Trademark Office*